E. G. HILL.
CAR FENDER.
APPLICATION FILED FEB. 8, 1911.
1,044,654.
Patented Nov. 19, 1912.
3 SHEETS—SHEET 2.
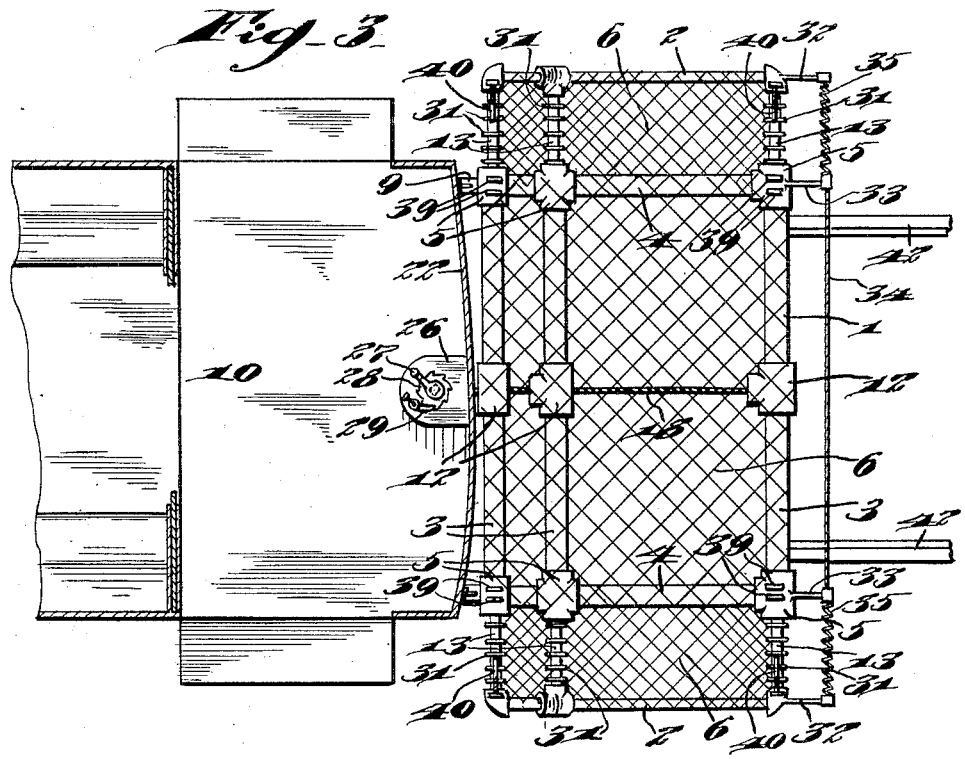
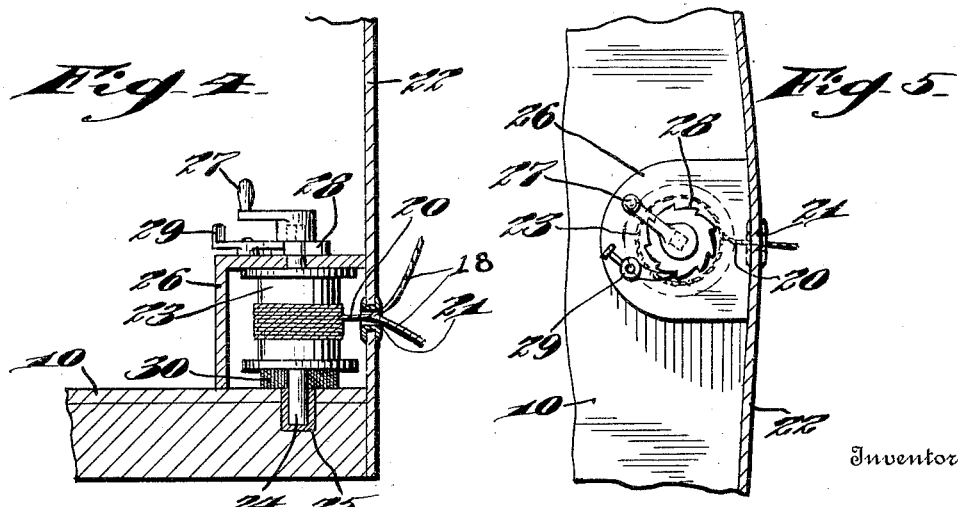

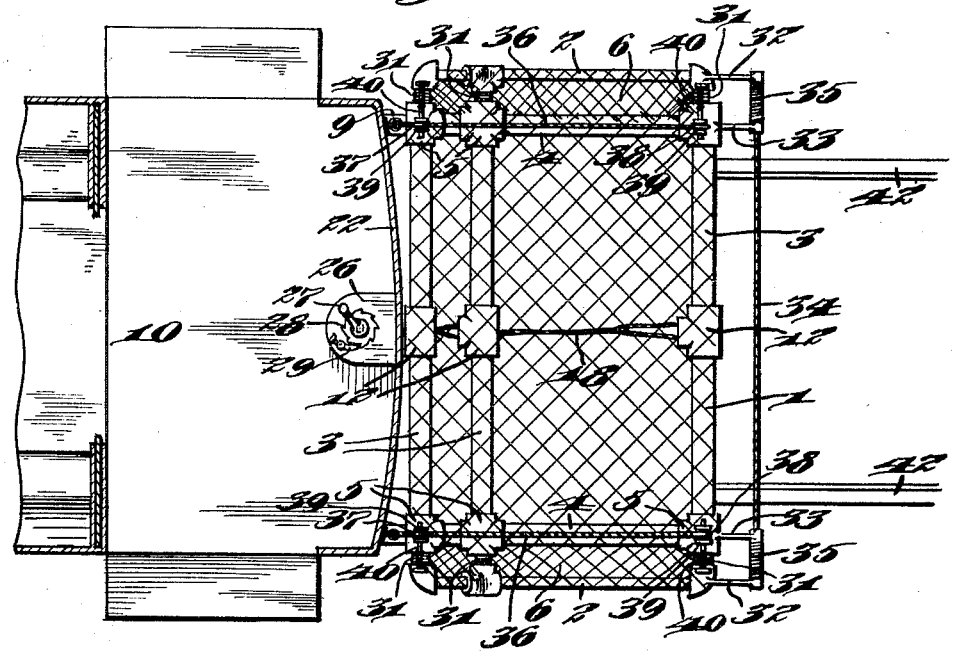

E. G. HILL.
CAR FENDER.
APPLICATION FILED FEB. 8, 1911.
1,044,654.
Patented Nov. 19, 1912.
3 SHEETS—SHEET 3.
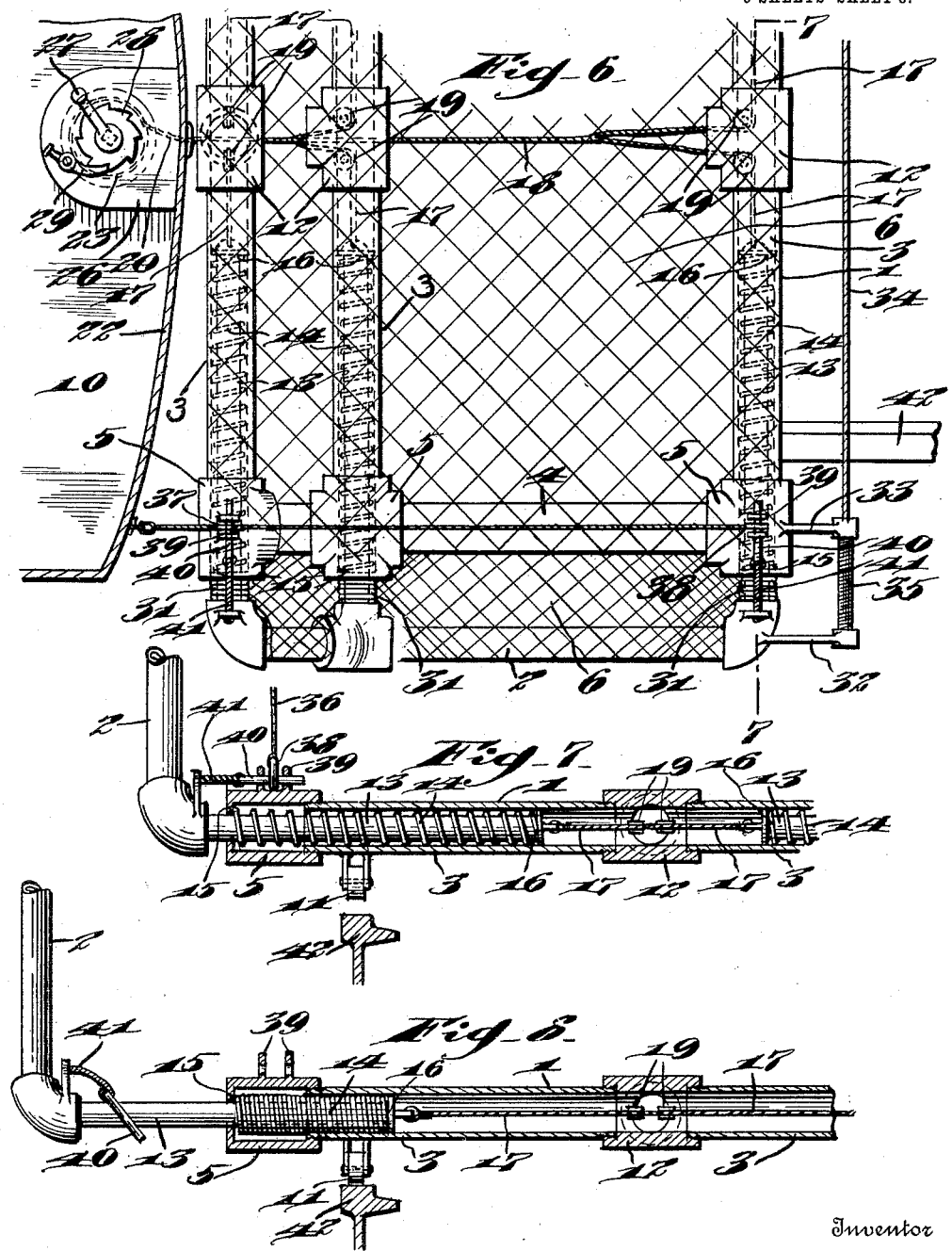

UNITED STATES PATENT OFFICE.

ELWYN G. HILL, OF PHILADELPHIA, PENNSYLVANIA.

CAR-FENDER.

1,044,654.  Specification of Letters Patent.  Patented Nov. 19, 1912.

Application filed February 8, 1911. Serial No. 607,260.

*To all whom it may concern:*

Be it known that I, ELWYN G. HILL, a citizen of the United States, residing at Philadelphia, in the county of Philadelphia and State of Pennsylvania, have invented certain new and useful Improvements in Car-Fenders, of which the following is a specification.

My invention relates to improvements in car fenders, an object of the invention being to provide a car fender which is expansible laterally, which is normally constructed so as to occupy the minimum of space, and which when released will expand laterally so as to prevent a person or object struck by the fender from passing over the side of the fender under the wheels.

A further object is to provide improved means for holding the forward end of the fender elevated slightly above the track, and improved means for holding the fender contracted laterally, and to provide improved means for releasing simultaneously both of said holding means, permitting the fender to fall into close contact with the track, and permitting it to expand laterally.

With these and other objects in view, the invention consists in certain novel features of construction and combinations and arrangements of parts, as will be more fully hereinafter described and pointed out in the claims.

In the accompanying drawings: Figure 1, is a plan view of Fig. 2 showing the fender in contracted or set position. Fig. 2, is a view in side elevation of the fender, showing the car in section. Fig. 3, is a view similar to Fig. 1, but showing the fender expanded. Fig. 4, is a sectional elevation illustrating the fender holding means. Fig. 5, is a plan view of Fig. 4. Fig. 6, is a fragmentary plan view of my improved fender on an enlarged scale. Fig. 7, is a fragmentary view in section on the line 7—7 of Fig. 6, and Fig. 8, is a view taken on the same line as Fig. 7, but showing the fender expanded.

My improved fender comprises a central main rigid section 1, and laterally movable side sections 2. Section 1 of the fender comprises three laterally disposed tubes 3, connected to side tubes 4 by means of pipe couplings 5. There are preferably three of the lateral tubes 3, and the side tubes 4 and couplings 5 are so arranged as to form a fender of the ordinary obtuse angled scoop shape. When the ordinary rope netting 6 is secured to the frame formed by the tubes 3 and 4, a scoop and back portion is provided, as is customary with fenders in general use. The couplings 5, at the ends of the intermediate tube 3 are provided with rearwardly projecting arms 7 pivotally secured in the socketed ends 8 of brackets 9. Brackets 9 are fixed to the car platform 10, and project forwardly therefrom so as to allow the fender movement. The forward end of the fender is provided with rollers 11 adapted to run on the track when the fender is lowered, and the tubes 3 each comprise two sections which are screwed into central T-couplings 12 for a purpose which will hereinafter appear. The side sections 2, comprise rod frames having rope netting 6 therein and the laterally projecting rods 13 of said frames telescope in the tubes 3 and are forced outward by means of coiled springs 14.

One end of each coiled spring 14 is secured in an end coupling 5, as shown at 15, and the other end of said spring is secured in the rod 13, as shown at 16, so that the contraction of said springs forces outward the side sections. The inner ends of these rods 13 are connected by branch cables 17 with main cables 18, said branch cables 17 extending around pulleys 19, and out through the couplings 12. These main cables 18 serve to connect all of the branch cables in the several tubes 3, and are connected to a common cable 20. Cable 20 projects through an opening 21 in a dashboard 22 and is wound upon a drum 23 as shown most clearly in Fig. 4. Drum 23 is secured upon a vertical shaft 24, mounted at its lower end in a bearing 25 in platform 10, and at its upper end projecting through a casing 26 inclosing the drum. On the upper end of this shaft, a crank 27 is provided to turn the drum and wind the cable thereon, and a ratchet wheel 28 is also secured on this shaft and engaged by a foot operated dog 29 to hold the shaft against turning. It will therefore be noted that when the drum is turned in one direction to wind the cable 20 thereon, both side sections 2 will be drawn inwardly to the position shown in Fig. 1, dog 29 holding them in this position. This turning of the drum is facilitated by a spring 30, mounted on the shaft 24, and serving to assist in this winding operation. When the dog 29 is kicked to release ratchet 28, side sections 2 will spring outwardly, and to facilitate the mounting of the netting 6 on these sections 2, the netting is preferably provided with rings 31 which slide upon the rods 13.

The lower forward ends of sections 2 are provided with forwardly projecting lugs 32, and the outside couplings 5 on the forward tube 3 are provided with forwardly projecting lugs 33. The lugs 33 are connected by a rope 34, which serves as a cushion to strike the person or object without injuring the same. Between lugs 32, and 33, springs 35 bridge said space and may of course be contracted and expanded as the side sections 2 move inwardly and outwardly. To hold the fender normally elevated, cables 36 are secured at one end to the platform 22, and are provided with eyes or rings 37 and 38, the former at their forward ends. The end coupling 5 of the forward tube 3, and the end coupling 5 of the rearward tube 3, are provided with parallel perforated ears 39 between which the rings 38 are positioned, and are held by means of pins 40 projected through the perforated ears and through the rings. These pins 40 are connected by cords 41 with sections 2, so that when the latter spring outwardly, they will pull the pins out of the eyes 39 and release the fender sections from the cables 36, allowing the same to fall with its rollers 11 on the rails 42.

In operation, the fender is normally in the position shown in Fig. 1. That is, drum 23 is turned so as to draw inwardly the side sections 2, and is locked by means of the dog 29. The pins 40 are in the ears 39, and through the rings 38, so that the fender is maintained in its normally elevated position. If the motorman sees a person or object on the track, he kicks the dog 29, releasing the ratchet wheel 28. Instantly the springs 14 force sections 2 outwardly, which through the medium of cords 41, draws pins 40 out of the ears 39, releasing the fender from cables 38, and allowing it to fall, the arms 7 pivoting in the cables 8. When the fender falls, the rollers 11 will run along the track 42, rendering it impossible for the person or object passing below the fender and the expanded side sections will insure the picking up of the person or object and prevent any possibility of passing over the side of the fender, and under the wheels. To again set the fender, it is simply necessary to turn the crank 27, which operation is assisted by the spring 30, and when the sections 2 are drawn inwardly, the dog 29 is positioned to lock the ratchet 28. The fender is then elevated by hand, and the pins 40 positioned in the rings 38, so that the fender is again set for use.

Various slight changes might be made in the general form and arrangement of parts described without departing from my invention, and hence I do not limit myself to the precise details set forth, but consider myself at liberty to make such changes and alterations as fairly fall within the spirit and scope of the appended claims.

Having thus described my invention, what I claim as new, and desire to secure by Letters Patent is:

1. In a car fender, the combination with a central main tubular frame, of side sections, rods on said side sections telescoping in the tubular main frame, springs pressing said rods outwardly, and means normally holding said rods telescoped in the tubes, substantially as described.

2. In a car fender, the combination with a central main tubular frame, of side sections, rods on said side sections telescoping in the tubular main frame, springs pressing said rods outwardly, a drum, cables connected to the ends of said rods and to said drum, means for turning the drum, and means for locking the drum, substantially as described.

3. In a car fender, the combination with a central main tubular frame, of side sections, rods on said side sections telescoping in the tubular main frame, springs pressing said rods outwardly, a drum, cables connected to the ends of said rods and to said drums, means for turning the drum, means for locking the drum, and a spring adapted to turn said drum in a direction to wind said cable thereon, substantially as described.

4. In a laterally expansible car fender, a central tubular frame and side frames telescoping therein, means for holding said side frames in retracted position, arms pivotally supporting said frames, means normally holding said frames elevated, and said last-mentioned means being released when said side frames are extended, substantially as described.

5. In a laterally expansible car fender, a central tubular frame and side frames telescoping therein, means for normally holding said side frames in retracted position, and springs for extending said side frames when permitted by said first mentioned means, arms pivotally supporting said frames and means normally holding said frames elevated, said last mentioned means being released when said side frames are extended, substantially as described.

6. In a car fender, the combination with a tubular central frame and side frames telescoping therein, of means for normally holding said side frames retracted, arms pivotally supporting said frames and means normally holding said frames elevated, said last mentioned means being released when said side frames are extended, substantially as described.

7. In a car fender, the combination with a central main tubular frame, of side sections, rods on said side sections telescoping in the tubular main frame, springs pressing said rods outwardly, means normally holding said rods telescoped in the tubes, arms pivotally supporting said frame and means normally holding said frame elevated, said last-mentioned means being released when said side sections are extended, substantially as described.

8. In a car fender, the combination with a central main tubular frame, of side sections, rods on said side sections telescoping in the tubular main frame, springs pressing said rods outwardly, a drum, cables connected to the ends of said rods and to said drum, means for turning the drum, means for locking the drum, arms pivotally supporting said frame and means normally holding said frame elevated, said last-mentioned means being released when said side sections are extended, substantially as described.

9. In a car fender, the combination with a central main tubular frame, of side sections, rods on said side sections telescoping in the tubular main frame, springs pressing said rods outwardly, a drum, cables connected to the ends of said rods and to said drums, means for turning the drum, means for locking the drum, a spring adapted to turn said drum in a direction to wind said cable thereon, arms pivotally supporting said frame, and means normally holding said frame elevated, said last-mentioned means being released when said side sections are extended, substantially as described.

10. In a laterally expansible car fender a scoop comprising a central section and laterally extendible side sections, means for holding said scoop contracted, arms pivotally supporting said scoop, means normally holding said scoop elevated, said last mentioned means being released when said scoop is expanded, said holding means comprising cables fixed at one end, rings on said cables, perforated ears on the scoop to receive between them the said rings, pins positioned in said ears and rings, and cords connecting said pins with the side sections, substantially as described.

11. In a laterally expansible car fender a scoop comprising a central section and laterally extendible side sections, means for holding said scoop contracted, springs for expanding said scoop when permitted by said first mentioned means, arms pivotally supporting said scoop, means normally holding said scoop elevated, said last mentioned means being released when said scoop is expanded, said holding means comprising cables fixed at one end, rings on said cables, perforated ears on said scoop to receive said rings between them, pins positioned in said ears and rings, and cords connecting said pins with said side sections, substantially as described.

12. In a car fender, the combination with a main or central frame section, of lateral side sections telescoping in the central frame section, arms pivotally supporting said central frame section, means normally holding said central frame section elevated, said last mentioned means being released when said side sections are extended, said holding means comprising cables fixed at one end, rings on said cables, perforated ears on the central frame section adapted to receive between them the said rings, pins positioned in said ears and rings, and cords connecting said pins with the side sections substantially as described.

13. In a car fender, the combination with a central main tubular frame, of side sections, rods on said side sections telescoping in the main tubular frame, springs pressing said rods outwardly, means normally holding said rods telescoped in the tubes, arms pivotally supporting said frame, means normally holding said frame elevated, said last-mentioned means being released when said side sections are extended, said holding means comprising cables fixed at one end, rings on said cables, perforated ears on the frame to receive between them the said rings, pins positioned in said ears and rings, and cords connecting said pins with the side sections, substantially as described.

14. In a car fender, the combination with a central main tubular frame, of side sections, rods on said side sections telescoping in the tubular main frame, springs pressing said rods outwardly, a drum, cables connected to the ends of said rods and to said drum, means for turning the drum, means for locking the drum, arms pivotally supporting said frame, means normally holding said frame elevated, said last-mentioned means being released when said side frames are extended, said holding means comprising cables fixed at one end, rings on said cables, perforated ears on said frame to receive between them the said rings, pins positioned in said ears and rings, and cords connecting said pins with the side sections, substantially as described.

15. In a car fender, the combination with a central main tubular frame, of side sections, rods on said side sections telescoping in the tubular main frame, springs pressing said rods outwardly, a drum, cables connected to the ends of said rods and to said drums, means for turning the drum, means for locking the drum, a spring adapted to turn said drum in a direction to wind said cable thereon, arms pivotally supporting said frame, means normally holding said frame elevated, said last-mentioned means being released when said side sections are extended, said holding means comprising cables fixed at one end, rings on said cables, perforated ears on said frame to receive between them the said rings, pins positioned in said ears and rings, and cords connecting said pins with the side sections, substantially as described.

In testimony whereof I have signed my name to this specification in the presence of two subscribing witnesses.

ELWYN G. HILL.

Witnesses:
R. H. KRENKEL,
CHAS. E. POTTS.

Copies of this patent may be obtained for five cents each, by addressing the "Commissioner of Patents, Washington, D. C."